United States Patent
Nguyen et al.

(10) Patent No.: US 9,148,817 B1
(45) Date of Patent: Sep. 29, 2015

(54) METHODS AND SYSTEMS FOR ROUTING SIGNALING TRAFFIC

(71) Applicant: Sprint Spectrum L.P., Overland Park, KS (US)

(72) Inventors: Khoi Nguyen, Lenexa, KS (US); Seng Gan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 13/746,126

(22) Filed: Jan. 21, 2013

(51) Int. Cl.
*H04W 28/02* (2009.01)

(52) U.S. Cl.
CPC .................................. *H04W 28/0268* (2013.01)

(58) Field of Classification Search
None
See application file for complete search history.

(56) References Cited

U.S. PATENT DOCUMENTS

| | | | |
|---|---|---|---|
| 6,426,943 B1 * | 7/2002 | Spinney et al. | 370/235 |
| 6,473,432 B1 * | 10/2002 | Nishimura et al. | 370/412 |
| 6,957,042 B2 | 10/2005 | Williams | |
| 8,547,899 B2 * | 10/2013 | Kish | 370/328 |
| 2006/0164988 A1 * | 7/2006 | Mishra et al. | 370/235 |
| 2008/0076421 A1 * | 3/2008 | Schwarz | 455/435.3 |
| 2010/0157825 A1 * | 6/2010 | Anderlind et al. | 370/252 |
| 2012/0106437 A1 * | 5/2012 | Seo et al. | 370/315 |
| 2012/0300629 A1 * | 11/2012 | Drucker | 370/235 |
| 2013/0225181 A1 * | 8/2013 | Radulescu et al. | 455/442 |
| 2013/0225182 A1 * | 8/2013 | Singh et al. | 455/444 |
| 2014/0177840 A1 * | 6/2014 | Liu | 380/270 |

* cited by examiner

*Primary Examiner* — Donald Mills (57) ABSTRACT

Disclosed herein are methods and systems for routing signaling traffic. One embodiment takes the form of a method that involves a networking device determining that a level of signaling traffic intended for a group of one or more destinations is greater than a threshold level, and responsive to the signaling traffic being greater than the threshold level, the networking device lowering a priority assigned to signaling traffic intended for the group of one or more destinations. The networking device may output the signaling traffic intended for the group of one or more destinations with the lowered priority.

19 Claims, 4 Drawing Sheets

METHODS AND SYSTEMS FOR ROUTING SIGNALING TRAFFIC

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless coverage devices (WCDs) such as cell phones, tablet computers, tracking devices, embedded wireless modules, mobile hotspots, and other wirelessly-equipped communication devices, can operate. Each base station may be coupled via a backhaul to a core network, which in turn provides connectivity with one or more transport networks such as the public switched telephone network (PSTN) and/or the Internet for instance. With this arrangement, a WCD operating in coverage of the network may engage in air interface communication with a base station and may thereby communicate via the base station with various remote network entities or with other WCDs served by the base station.

The cellular wireless network may operate in accordance with a particular air interface protocol or "radio access technology," with communications from the base stations to WCDs defining a downlink (or forward link) and communications from the WCDs to the base stations defining an uplink (or reverse link). Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. The architecture of the cellular wireless network may vary depending on the protocol employed.

The backhaul that couples the base stations to the core network may include equipment, such as a backhaul router, which functions to distribute signaling data (e.g., paging and/or other control data) and/or bearer data between the base stations and a signaling entity of the core network. For instance, in a CDMA network, a backhaul router may distribute signaling and/or bearer data between base stations and a radio network controller (RNC) or base station controller (BSC). As another example, in an LTE network, a backhaul router may distribute signaling and/or bearer data between one or more base stations and a mobility management entity (MME). Other configurations are possible as well. The backhaul router may also perform other functions, such as supporting routing protocols.

OVERVIEW

In the configuration described above, it may be the case that a source of signaling traffic is capable of generating and/or outputting a higher level of signaling traffic than a destination of the signaling traffic can process. For example, a signaling entity in a core network (e.g., an MME, RNC, or BSC) may be capable of generating and/or outputting signaling traffic at a much higher rate than any base station in the network can handle. This may result in the destination becoming overwhelmed by incoming signaling traffic and ultimately shutting down—even in situations where the destination is configured to drop a certain level of incoming data.

Disclosed herein are methods that help to address this issue. According to embodiments of the disclosed methods, a networking device that sits between one or more sources and a group of one or more destinations of signaling traffic (e.g., a backhaul router between an MME and one or more base stations) may determine that a level of signaling traffic intended for the group of one or more destinations is greater than a threshold level, which may be defined based on the level of signaling traffic that can be handled by the group of one or more destinations. Responsive to this determination, the networking device may reduce a priority associated with the signaling traffic intended for the group of one or more destinations and then output this signaling traffic (or at least a portion thereof) at the lower priority. For example, the backhaul router may reduce a quality of service (QoS) associated with signaling traffic intended for the group of one or more destinations. This lowering of the priority associated with signaling traffic intended for the group of one or more destinations may in turn result in a reduction in the rate at which signaling traffic is received by the group of one or more destinations—which may reduce the processing burden on the group of one or more destinations without necessarily requiring the source and/or the group of one or more destinations to drop packets.

In one embodiment, the disclosed methods may include, in a networking device coupled between one or more signaling sources and the group of one or more destinations, (a) determine that a level of signaling traffic (e.g., paging and/or control traffic) intended for a group of one or more destinations is greater than a threshold level, (b) responsive to determining that the level of signaling traffic intended for the group of one or more destinations is greater than the threshold level, lowering a priority assigned to signaling traffic intended for the group of one or more destinations, and (c) outputting the signaling traffic intended for the group of one or more destinations with the lowered priority.

The one or more sources and the group of one or more destinations of the signaling traffic may take various forms. In one implementation, the one or more sources may be one or more signaling entities of a core network (e.g., MMEs, RNCs, BSCs, etc.) and the group of one or more destinations may then take the form of a group of one or more base stations, such as a single base station, a group of base stations at a given location (e.g., a cell site), a given subnetwork of base stations, and/or all base stations coupled to the networking device. In another implementation, the one or more sources may be base stations and the group of one or more destinations may then take the form of a group of one or more signaling entities of a core network (e.g., MMEs, RNCs, and/or BSCs). Other implementations are possible as well.

The feature of lowering the priority assigned to signaling traffic intended for the given destined for the group of one or more destination may also take various forms. In one example, this feature may involve lowering the priority from a first priority to a second priority, such as by switching from (i) assigning a first priority (e.g., a high-priority Quality of Service (QoS) tag) to signaling traffic intended for the group of one or more destinations to (ii) assigning a second priority (e.g., a medium-priority Quality of Service (QoS) tag, a normal-priority QoS tag, or a low-priority QoS tag) to signaling traffic intended for the group of one or more destinations. In another example, the feature of lowering the priority assigned to signaling traffic intended for the group of one or more destinations may involve adjusting a differentiated services code point (DSCP) value assigned to that signaling traffic. This feature of lowering the priority assigned to signaling traffic intended for the group of one or more destinations may take other forms as well.

Further, the threshold level may take various forms. In one implementation, the threshold level may be defined based on the form and/or capabilities of the group of one or more destinations. For example, the threshold level may be defined based on a maximum capacity of signaling traffic that the group of one or more destinations can handle (either individually or collectively). As another example, the threshold level may be defined based on a number of destinations in the group of one or more destinations. The threshold level may take other forms as well.

Also disclosed herein are structures configured to facilitate implementation of the disclosed methods. One embodiment may take the form of a networking device (e.g., a backhaul router) that includes a communication interface, a processor, data storage, and program instructions executable by the processor for carrying out the functions described herein. Another embodiment may take the form of a non-transitory computer readable medium having instructions stored thereon for carrying out the functions described herein.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
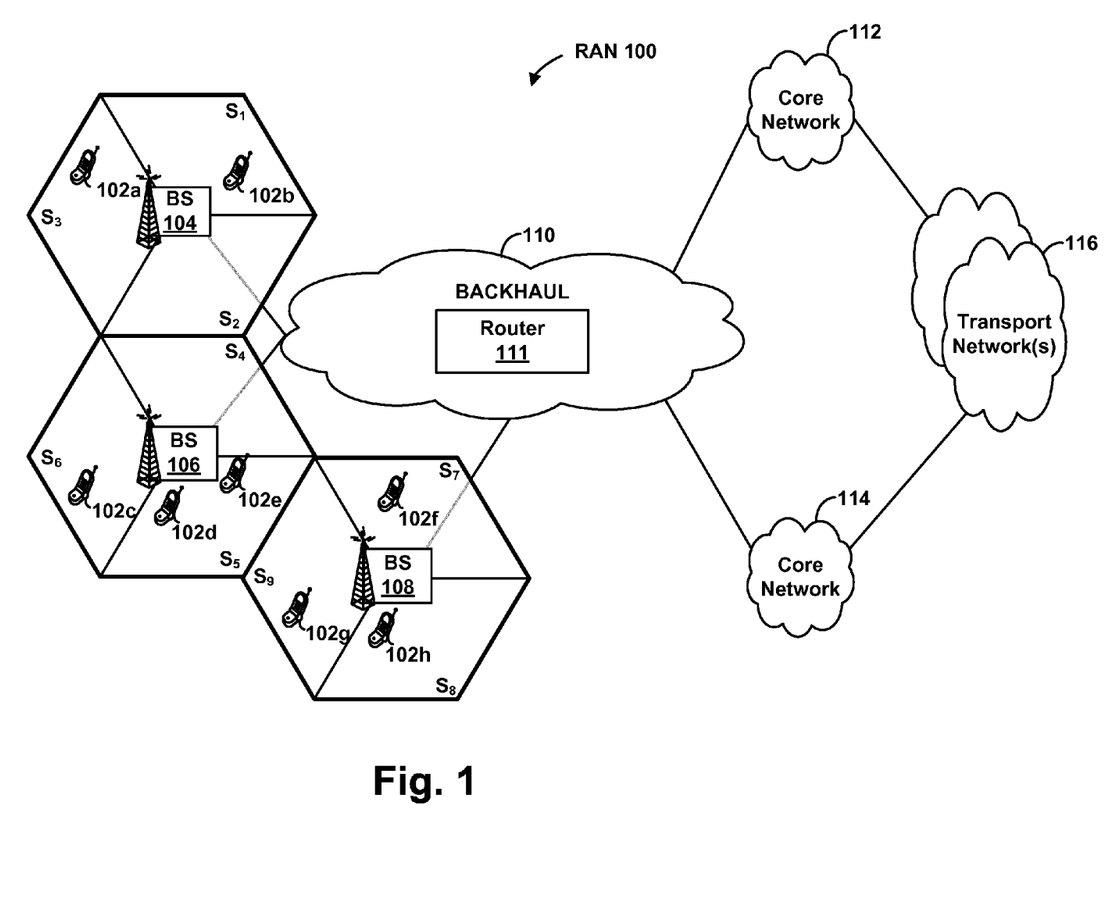
FIG. 1 is a simplified block diagram of an example communication system in which embodiments of the disclosed methods and entities can be implemented.

Referring to the Figures, FIG. 1 is a simplified block diagram of an example communication system in which embodiments of the disclosed methods and entities can be implemented. In particular, FIG. 1 includes a radio access network (RAN) 100 that may facilitate wireless communication with a plurality of WCDs (also referred to as UEs or mobile stations), such as WCDs 102a-h, and provide connectivity with one or more transport networks 116, such as the public switched telephone network (PSTN) and/or the Internet.

As shown, the RAN 100 may include one or more cell sites that each include at least one base station (e.g., base transceiver station, access node, node-Bs, eNodeBs, etc.), such as a first base station 104 at a first cell site, a second base station 106 at a second cell site, and a third base station 108 at a third cell site. Each of these base stations may include an antenna arrangement and associated equipment that radiates to define one or more coverage areas (e.g., a cell and/or cell sectors) in which WCDs 102a-h can operate and engage in wireless communication with RAN 100 over an air interface. For example, as shown, base station 104 may radiate to define sectors $S_1$-$S_3$, base station 106 may radiate to define sectors $S_4$-$S_6$, and base station 108 may radiate to define sectors $S_7$-$S_9$. It should be understood, however, that the depicted arrangement of cell sites, base stations, and coverage areas is for purposes of illustration only, and that numerous other arrangements of cell sites, base stations, and coverage areas are possible as well.

In practice, the base stations in the RAN 100, such as base stations 104, 106, and 108, may each be configured to communicate with WCDs according to an agreed air-interface protocol, examples of which include CDMA (e.g., 1xRTT or 1xEV-DO), LTE, WiMAX, IDEN, HSDPA, GSM, WI-FI, and/or any others now known or later developed. In this respect, although not shown, a cell site may include multiple base stations that are each arranged to communicate with WCDs according to a different air-interface protocol, such as a first base station arranged to communicate according to an LTE protocol, a second base station arranged to communicate according to a 1xEV-DO protocol, and a third base station arranged to communicate according to a 1xRTT protocol. Various other configurations are possible as well.

Each air-interface protocol may divide the air interface in each coverage area into a "forward link" (or "uplink") for carrying communications from a base station to WCDs and a "reverse link" (or "downlink") for carrying communications from WCDs to the base station. Further, the agreed air-interface protocol may also divide the air interface's forward and reverse link into a plurality of channels, such as shared control channels for carrying control data (e.g., pilot signal, registration messages, call-setup messages, system parameter messages, etc.) and dedicated traffic channels for carrying bearer traffic data.

As further shown in FIG. 1, the RAN 100 may include one or more core networks, such as core networks 112 and 114, which may provide connectivity to one or more transport networks 116 and may also help to control operation of the cell sites. Depending on the air-interface protocol employed, each of core networks 112 and 114 may include various network infrastructures, as described in more detail with reference to FIG. 2.

To interconnect the RAN's cell sites and core networks, the RAN 100 may further include a backhaul 110. This backhaul 110 may include a networking device, such as a single networking device or multiple networking devices that may be interconnected. For example, the backhaul 110 may include a networking device such as a backhaul router 111, which may function to distribute signaling and/or bearer data between entities at the RAN's cell sites and entities at the core networks 112, 114. The backhaul router 111 may receive signaling and/or bearer data from a base station at one of the RAN's cell sites (e.g., base stations 104, 106, or 108) and then route the received data to the appropriate core network(s) (e.g., core network 112 and/or 114). In another example, the backhaul router 111 may receive signaling and/or bearer data from one of the core networks (e.g., core network 112 or 114) and then route the received data to the appropriate base station(s) at the RAN's cell sites (e.g., base stations 104, 106, and/or 108). The router 100 may be configured to operate according to any of a variety of protocols, examples of which include 802 and/or 803 protocols. Further, the data distributed by the router may take a number of forms, such as one or more data packets. The backhaul router 111 may also be configured to perform any number of additional functions related to the distribution of data between the RAN's cell sites and core networks.

It should be understood that the configuration depicted in FIG. 1 is for purposes of illustration, and that various other configurations are possible as well. As an example, the RAN's base stations and core networks 112, 114 may communicate along a different path that does not include a backhaul router 111. In another example, the path between RAN's base stations and core networks 112, 114 may include various other entities in addition to the backhaul router 111, such as other networking devices for instance.

WCDs 102a-h may each be any device configured to receive wireless service from RAN 100. By way of example only, WCDs 102a-h may take the form of cell phones, tablet computers, laptop computers, wirelessly equipped personal digital assistants (PDA), personal computers, home electronic devices, tracking devices, embedded wireless modules, mobile hotspots, and other wirelessly-equipped communication devices that are now known or may be later developed. One or more of the plurality of WCDs 102a-h may be equipped with hardware, software, and/or other program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein. For example, one or more of the plurality of WCDs 102a-h may include hardware, software, and/or other program logic to communicate with one or more base stations 104, 106, 108, or other RAN 100 devices in accordance with an agreed communication protocol, such as one of the protocols noted herein for instance.

Figure 2:
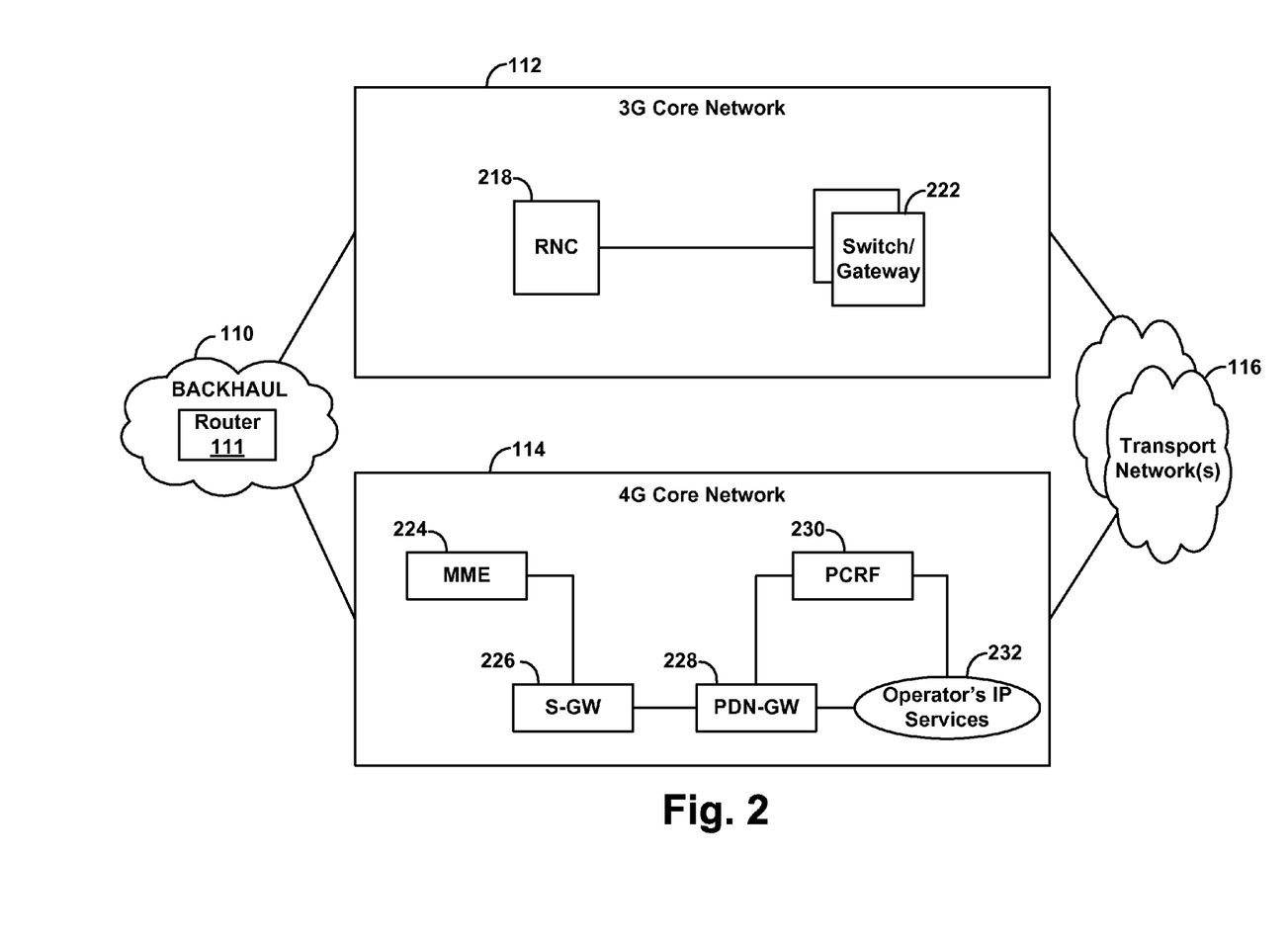
FIG. 2 is a simplified block diagram illustrating a communication system, according to embodiments.

Turning next to FIG. 2, a more specific block diagram depicting one embodiment of the example communication system depicted in FIG. 1 is shown. In the arrangement of FIG. 2, core network 112 is an example 3G CDMA core network and core network 114 is an example 4G LTE core network. These networks could take other forms as well, using other protocols such as WiMAX, GSM, or others now known or later developed.

As shown in FIG. 2, the example 3G CDMA core network 112 may include a radio network controller (RNC) (also known as a base station controller (BSC)), such as BSC 218, which may be configured to perform a number of functions. For example, the RNC 218 may be configured to control one or more CDMA base stations of the RAN 100. As another example, the RNC 218 may be configured to allocate radio channels, manage radio resources, control handovers from base stations to one or more base transceiver stations (BTS), etc. The RNC 218 may then be coupled with one or more switches or gateways, such as switch/gateway 222, which may provide connectivity with one or more transport networks 116. Although not shown, the example 3G CDMA core network 112 may include various other components as well.

The example 4G core network 114 may include one or more mobile management entities (MMEs), such as MME 224, which may be configured to control communications between one or more LTE base stations of the RAN 100 and one or more gateways, such as serving gateway (S-GW) 226 and packet data network gateway (PDN-GW) 228. In addition, MME 224 may support functionality such as mobility management, bearer management, paging-message distribution, security functions, authentication of WCDs, gateway selection for communications, and so on. MME 224 may perform other functions as well.

S-GW 226 may be configured to provide various functions, such as packet routing and forwarding, mobility anchoring, packet buffering, and so on. In turn, the PDN-GW 228 may be configured to facilitate packet-data communications with one or more transport networks 116. PDN-GW 228 may also be configured to perform other functions, such as filtering one or more downlink IP packets into different QoS-based IP packets and IP address allocation for one or more WCDs. PDN-GW 228 may also perform QoS enforcement based on rules from a policy control and charging rules function (PCRF) 230, which may provide QoS authorization (e.g., QoS class identifiers and bit rates) that may be used to determine how the IP packets are treated by other components in the 4G LTE core network 114. Although not shown, the example 3G CDMA core network 112 may include various other components as well, such as a PCEF, a home subscriber server (HSS), etc.

Although not shown, the example communication system may further include networking infrastructure that supports interworking between wireless networks operating according to different protocols, such as example 3G CDMA core network 112 and example 4G LTE core network 114. For example, the communication system may include an interworking function (IWF) that may support communications between components of the 4G LTE core network 114 (e.g., MME 224) and components of the 3G CDMA core network 112 (e.g., RNC 218 and/or a switch/gateway 222), so that a service provider may implement circuit-switched fallback (CSFB) or enhanced circuit-switched fallback (eCSFB) functionality. Other examples are possible as well.

Figure 3:
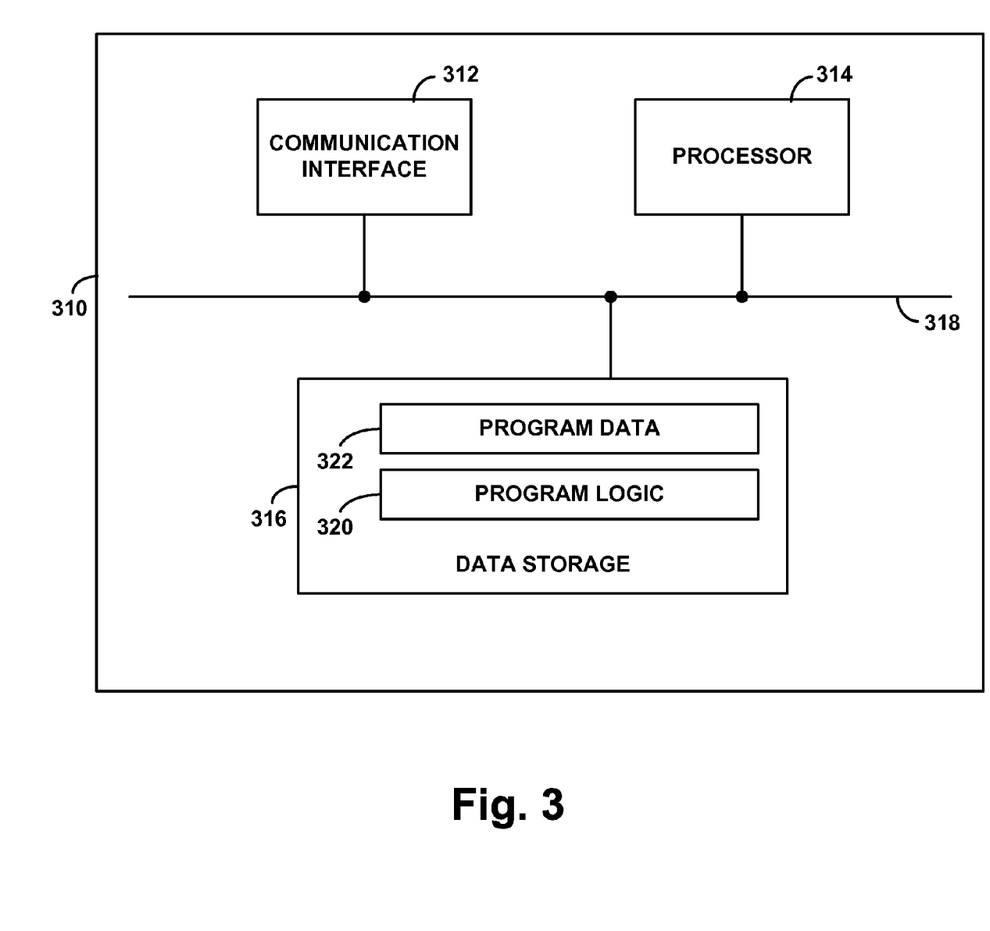
FIG. 3 is a simplified block diagram showing functional components that may be included in a networking device to facilitate implementation of the methods described herein.

FIG. 3 is a simplified block diagram showing functional components that may be included in an example networking device 310 to facilitate implementation of methods described elsewhere herein. As illustrated, in one embodiment, the networking device may take the form of a backhaul router, such as the backhaul router 111 discussed above. In other embodiments, the networking device may take the form of a different computing device or combination of computing devices, such as client devices, networking devices, servers, etc.

As shown, the example networking device 310 may include a communication interface 312, a processor 314, and data storage 316, all of which may be communicatively linked together by a system bus, network, or one or more other connection mechanisms 318. Although not shown, the example networking device 310 may also include other components, such as external storage. It should also be understood that the configuration and/or functionality of the example networking device 310 may be distributed and/or subdivided between a plurality of entities, such as multiple routers. Further, it should be understood that some of the functions described herein may be carried out by an entity other than a networking device.

In the example networking device 310, the communication interface 312 may comprise one or more structures, and associated equipment, for receiving signaling and/or bearer data from one or more sources and distributing signaling and/or bearer data to a group of one or more destinations. As described herein, the signaling traffic may include, for example, paging traffic, control traffic, etc. For instance, when signaling traffic is being sent downstream, the communication interface 312 may be configured to receive data from one or more core network entities (such as a MME or a RNC)

and to distribute data to a group of one or more base stations, such as a single base station, a group of base stations at a given location (e.g., a cell site), a given subnetwork of base stations, and/or all base stations coupled to the networking device. When signaling traffic is being sent upstream, the communication interface 312 may be configured to receive data from one or more base stations and to distribute data to one or more core network entities.

Processor 314 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processor 314 may be integrated in whole or in part with other components of the example networking device 310

The data storage 316 may be a non-transitory computer readable medium. For example, the data storage 316 may take the form of one or more volatile and/or non-volatile storage components, such as magnetic, optical, or organic storage components, integrated in whole or in part with a processor 314. As further shown, the data storage 316 may include program logic 320 and/or program data 322. The program logic 320 may include, for example, machine language instructions executable by a processor 314 to carry out various functions, such as the functionality of the methods and systems described herein. The program data 322 may include one or more types of data deemed suitable for a given implementation.

Figure 4:
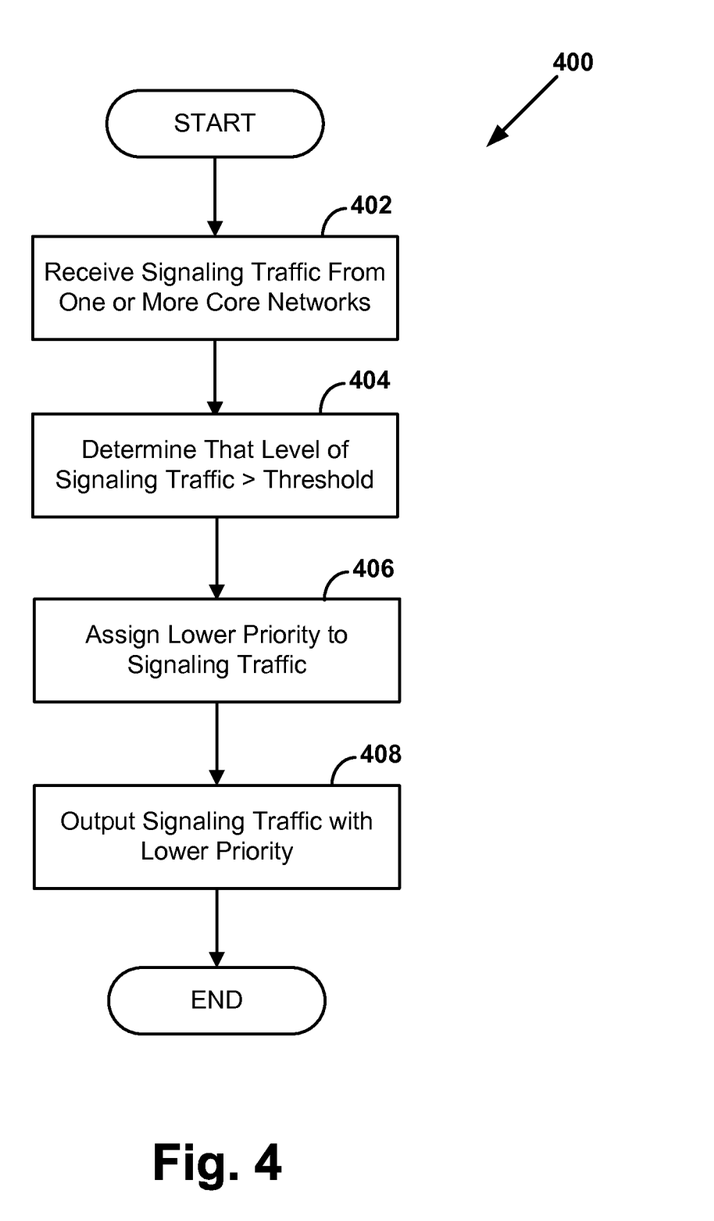
FIG. 4 is a flow chart depicting functions that may be carried out in accordance with embodiments.

FIG. 4 is a flow chart depicting functions that may be carried out in accordance with example embodiments described herein. For purposes of illustration, FIG. 4 is described in reference to a networking device, such as a backhaul router, receiving signaling traffic flowing downstream from one or more core networks (and in particular signaling entities such as a RNC or MME) to one or more cell sites (and in particular to base stations within the one or more cell sites). However, the example embodiments may be carried out by any entity (or group of entities) coupled between one or more sources and one or more destinations of signaling traffic. For example, multiple routers such as an IP aggregation (IPA) router and a cell site router may carry out one or more of the functions described herein.

As shown in FIG. 4, the example embodiment 400 may begin at block 402 with the backhaul router receiving signaling traffic from one or more core networks that is intended for a group of one or more base stations. This group of one or more base stations may take the form of a single base station, a group of base stations at a given location (e.g., a cell site), a given subnetwork of base stations, and/or all base stations coupled to the networking device.

The received signaling traffic may also take various forms. As an example, the signaling traffic may include paging traffic. In another example, the signaling traffic may be in the form of control traffic, such as messaging related to call setup and/or handover. The signaling traffic may take other forms as well. The backhaul router may store the signaling traffic in one or more queues for some period of time before distributing the signaling traffic to the group of one or more base stations. In one implementation, these queues may be designated with particular priority levels (e.g., high-priority, medium-priority, and low-priority queues), such that the backhaul router may select the queue in which to store the signaling traffic based on a priority of that signaling traffic.

The signaling traffic may be associated with one or more priorities. The one or more priorities may be indicative of a priority at which the signaling traffic may or should be processed by the destination. In another example, the priority may be indicative of a priority at which the signaling traffic may or should be sent from the source. The source may send signaling traffic associated with a higher priority before sending signaling traffic associated with a lower priority.

Priorities associated with signaling traffic may be represented in a variety of ways. For example, a priority associated with signaling traffic may be represented using a differentiated services code point (DSCP), which may be used to classify and/or manage signaling traffic. In another example, a priority associated with signaling traffic may be represented using a type of service (ToS) field that which may be included with the signaling traffic. In yet another example, a priority associated with signaling traffic may be represented using a QoS field or tag included with the signaling traffic. In still another example, a priority associated with signaling traffic may be represented by the particular queue in which the signaling traffic is stored at a networking device (e.g., a high-priority, medium-priority, or low-priority queue). Other examples are possible as well.

Priorities associated with signaling traffic may also be represented in a variety of formats, such as numerical, alphabetical, or alpha-numerical formats. The format used to represent the priority may be based on factors such as whether the priority is presented using DSCP, ToS, QoS, or another type of priority. The format may also vary based on the backhaul router and/or policies implemented at the backhaul router. For example, in some embodiments, a QoS priority may be represented as a numerical value between 0 and 7. In other embodiments, a QoS priority may be represented as a "high," "medium," "normal," or "low" priority. In yet further embodiments, the "high," "medium," "normal," or "low" priorities may be correlated with one or more of numerical QoS priorities.

At block 404, while receiving signaling traffic that is intended for the group of one or more base stations, the backhaul router may determine that a level of signaling traffic intended for the group of one or more base stations is greater than a first threshold level. The backhaul router may carry out this determination in various manners.

According to one example implementation, the backhaul may first assess the level of received signaling traffic intended for the group of one or more base stations. For example, the backhaul router may measure a total volume of signaling traffic intended for the group of one or more base stations that the backhaul router receives over a given time period. In another example, the backhaul router may measure a rate of the signaling traffic intended for the group of one or more base stations that the backhaul router receives over a given time period. Other examples are possible as well. The backhaul router may perform this assessment continuously, periodically, and/or in response to some triggering event.

After assessing the level of received signaling traffic intended for the group of one or more base stations, the backhaul router may then compare that level to the first threshold level to determine whether the level of received signaling traffic has exceeded the first threshold level. The first threshold level may be defined based on various criteria.

In one implementation, the first threshold level may be defined based on a level of signaling traffic that can be processed by the group of one or more base stations (either individually or collectively). For example, if a typical base station in the group is only capable of processing up to given rate of signaling traffic (e.g., three megabytes per second), the first threshold level may be set at or below that given rate so that the group of one or more base stations do not receive a higher rate of signaling traffic than can be processed. In this respect, the first threshold level may vary dynamically as the configuration of the network changes.

In another implementation, the first threshold level may be defined based on the number of base stations in the group of one or more base stations. For example, if the group includes a larger number of base stations (e.g., a subnetwork), the first threshold level may be set to a higher level. In this respect, the first threshold level may also vary dynamically as the configuration of the network changes.

These two implementations for defining the first threshold level may also be combined. And the first threshold level may be defined based on various other criteria as well.

At block 406, responsive to determining that the level of signaling traffic intended for the group of one or more base stations is greater than the first threshold level, the backhaul router may assign a lower priority to signaling traffic intended for the group of one or more base stations. For instance, after determining that the first threshold level is exceeded, the backhaul router may assign the lower priority to all signaling traffic intended for the group of one or more base stations that the backhaul router receives until the first threshold level is no longer exceeded. In addition, the backhaul router may also assign a lower priority to at least a portion of the signaling traffic intended for the group of one or more base stations that is presently stored in the queue. For example, if the backhaul router contains a queue of the most recent one second of data intended for the group of one or more base stations then the backhaul router may lower the priority of any signaling traffic that exceeds a threshold level of the signaling traffic.

The process of assigning a lower priority to signaling traffic intended for the group of one or more base stations may also take various forms. According to one implementation, the backhaul router may assign a lower priority to signaling traffic intended for the group of one or more base stations by lowering the priority of at least a portion of the received signaling traffic from a higher priority to one of a plurality of lower priorities. This lowering of the priority may take various forms.

As one example, the backhaul router may lower the priority of the signaling traffic by modifying associated data that reflects the priority level of the traffic, such as by changing a QoS tag (e.g., from a high QoS tag to a medium- or low-priority QoS tag) and/or altering a DSCP value. (Although this is described in terms of adjusting "high," "medium," and "low" QoS tags, it should be understood that there are many other ways in which QoS tags may be adjusted, such as with numerical values.) In this example, after modifying the associated data that reflects the priority level of the signaling traffic, the backhaul router may also use the modified data to store the signaling traffic in queues designated with the appropriate priority levels (e.g., a medium-priority queue for signaling traffic with a medium-priority QoS tag, a low-priority queue for signaling traffic with a low-priority QoS tag, etc.). In another example, the backhaul router may lower the priority of the signaling traffic by simply storing the traffic into one or more queues that are designated with a lower priority, without modifying any data associated with the traffic. Other examples are possible as well.

At block 408, after the priority of the signaling traffic intended for the group of one or more base stations has been lowered, the backhaul router may then output the signaling traffic with the lower priority. This feature of outputting the signaling traffic with the lower priority may take various forms.

In one implementation, the backhaul router may use the lowered priority of the signaling traffic to govern the manner in which such traffic is output. The backhaul router may carry out this feature using various techniques. As one example, the backhaul router may employ a scheme in which signaling traffic is stored in queues designated with respective priority levels (e.g., based on associated data such as QoS tag and/or DSCP value) and then output according to these queue designations. According to one scheme known as a priority queuing, for instance, the backhaul router may output all signaling traffic stored in the highest-priority queue, then all signaling traffic stored in the next-highest-priority queue, and so on. According to another scheme known as weighted-round-robin, the backhaul router may output a first amount of signaling traffic stored in the highest-priority queue, then a second amount of signaling traffic stored in the next-highest-priority queue, and so on, where the first amount exceeds the second amount by a predefined ratio (e.g., 2:1). Other such schemes could be employed as well.

As another example, the backhaul router may employ a scheme in which signaling traffic is output using associated data reflecting the priority level of the traffic, rather than the queues in which the signaling traffic is stored. Such schemes may be designed in a similar manner to the schemes discussed above (e.g., signaling traffic with associated data reflecting a highest priority is output at a higher rate than signaling traffic with associated data reflecting a next highest priority). The backhaul router may use the lowered priority of the signaling traffic to govern the manner in which such traffic is output in other manners as well.

In another implementation, the backhaul router may output the signaling traffic with the lower priority by simply outputting the signaling traffic with associated data that reflects the lowered priority (e.g., a modified QoS tag and/or DSCP value), without actually using the lowered priority of the signaling traffic to govern the manner in which such traffic is output. According to this implementation, a networking device downstream (e.g., a cell site router) may then actually use the data reflecting the lowered priority of the signaling traffic to govern the manner in which such traffic is output using any technique now known or later developed, including the output techniques discussed above.

In either implementation, outputting the signaling traffic with the lowered priority may ultimately result in a reduction in the rate at which signaling traffic is output to the group of one or more base stations (e.g., at the backhaul router and/or a networking device downstream), which may reduce the processing burden on the group of one or more base stations.

In a further embodiment, while receiving signaling traffic that is intended for the group of one or more base stations, the backhaul router may also later determine that a level of signaling traffic intended for the group of one or more base stations exceeds a second threshold level that is higher than the first threshold level. Responsive to this determination, the backhaul router may take further action to manage the signaling traffic intended for the group of one or more base stations. For example, the backhaul router may further lower the priority of the signaling traffic intended for the group of one or more base stations (e.g., from a medium-priority QoS tag to a low-priority QoS tag). As another example, the backhaul router may begin dropping signaling traffic intended for the group of one or more base stations. The backhaul router may take other actions as well.

It should be understood that the embodiments described above are illustrative and that a number of additional embodiments may also or optionally be implemented by the backhaul router. Further, while the example embodiment 400 has been described in terms of the signaling traffic intended for the group of one or more base stations exceeding the threshold level, it should be understood that the signaling traffic intended for the group of one or more base stations may often be less than or equal to the threshold level. In this situation, the backhaul router may maintain a priority assigned to the signaling traffic intended for the group of one or more base stations. Finally, as noted above, it should be understood that the example embodiment may be carried out to manage signaling traffic flowing from any one or more sources to any group of one or more destinations. For example, the example embodiment may be carried out to manage signaling traffic flowing upstream from one or more cell sites (e.g., base stations) to one or more core networks (e.g., RNCs or MMEs). Other examples are possible as well.

While some example embodiments have been described above, those of ordinary skill in the art will appreciate that numerous changes to the described embodiments could be made without departing from the scope and spirit of the claims.

What is claimed is:

1. A method comprising:
    in a networking device coupled between one or more signaling sources and a group of one or more destinations in a cellular wireless network, determining that a level of signaling traffic intended for the group of one or more destinations is greater than a threshold level;
    responsive to determining that the level of signaling traffic intended for the group of one or more destinations is greater than the threshold level, the networking device lowering a priority assigned to signaling traffic intended for the group of one or more destinations; and
    the networking device outputting signaling traffic intended for the group of one or more destinations with the lowered priority,
    wherein the one or more signaling sources comprise one or more signaling entities of a core network, and wherein the group of one or more destinations is selected from the group consisting of (i) a base station, (ii) a group of base stations at a given location (iii) a given subnetwork of base stations, and (iv) a plurality of base stations coupled to the networking device.

2. The method of claim 1, wherein lowering the priority assigned to signaling traffic intended for the group of one or more destinations comprises modifying data that reflects a priority level of the signaling traffic intended for the group of one or more destinations.

3. The method of claim 1, wherein lowering the priority assigned to signaling traffic intended for the group of one or more destinations comprises adjusting a Quality of Service (QoS) tag assigned to the signaling traffic from a high-priority QoS tag to one of a medium-priority QoS tag, a normal-priority QoS tag, and a low-priority QoS tag.

4. The method of claim 1, wherein lowering the priority assigned to signaling traffic intended for the group of one or more destinations comprises adjusting a differentiated services code point (DSCP) value assigned to signaling traffic intended for the group of one or more destinations.

5. The method of claim 1, wherein the networking device includes one or more networking devices.

6. The method of claim 1, wherein the networking device outputting signaling traffic intended for the group of one or more destinations with the lowered priority comprises using the lowered priority to decrease a rate at which to output the signaling traffic intended for the group of one or more destinations.

7. The method of claim 1, wherein lowering the priority assigned to signaling traffic intended for the group of one or more destinations comprises storing the signaling traffic in a given queue of a plurality of queues that is designated with a lower priority relative to at least one other queue of the plurality of queues, and wherein outputting signaling traffic intended for the group of one or more destinations with the lowered priority comprises employing at least one of a priority queuing scheme and a weighted round robin scheme on the plurality of queues.

8. The method of claim 1, wherein lowering the priority assigned to signaling traffic intended for the group of one or more destinations comprises modifying data that reflects a priority level of the signaling traffic intended for the group of one or more destinations, and wherein outputting signaling traffic intended for the group of one or more destinations with the lowered priority comprises outputting the signaling traffic with the modified data while maintaining an output rate of the signaling traffic intended for the group of one or more destinations.

9. The method of claim 1, wherein the threshold level is defined based on a level of signaling traffic that the group of one or more destinations is capable of processing.

10. The method of claim 1, wherein signaling traffic intended for the group of one or more destinations is one of paging traffic and control traffic.

11. The method of claim 1, wherein the threshold level is defined based on a number of destinations in the group of one or more destinations.

12. A networking device comprising:
    a communication interface configured to provide connectivity with signaling sources and destinations in a cellular wireless network;
    a processor; and
    data storage containing program instructions executable by the processor for carrying out a set of functions, wherein the set of functions includes:
    determining that a level of signaling traffic received from one or more signaling sources and intended for a group of one or more destinations is greater than a threshold level;
    responsive to determining that the level of signaling traffic intended for the group of one or more destinations is greater than the threshold level, lowering a priority assigned to signaling traffic intended for the group of one or more destinations, wherein lowering the priority assigned to signaling traffic intended for the group of one or more destinations comprises an operation selected from the group consisting of (i) adjusting a Quality of Service (QoS) tag assigned to the signaling traffic from a high-priority QoS tag to one of a medium-priority QoS tag, a normal-priority QoS tag, and a low-priority QoS tag and (ii) adjusting a differentiated services code point (DSCP) value assigned to signaling traffic intended for the group of one or more destinations; and
    outputting signaling traffic intended for the group of one or more destinations with the lowered priority.

13. The networking device of claim 12, wherein the threshold level is defined based on a number of destinations in the group of one or more destinations.

14. The networking device of claim 12, wherein the networking device includes one or more networking devices.

15. The networking device of claim 12, wherein signaling traffic intended for the group of one or more destinations is one of paging traffic and control traffic.

16. The networking device of claim 12, wherein the threshold level is defined based on a level of signaling traffic that the group of one or more destinations is capable of processing.

17. The networking device of claim 16, wherein the threshold level comprises a maximum rate of signaling traffic that the group of one or more destinations is capable of processing.

18. The networking device of claim 12, wherein the one or more signaling sources comprise one or more signaling entities of a core network, and wherein the group of one or more destinations is selected from the group consisting of (i) a base station, (ii) a group of base stations at a given location (iii) a given subnetwork of base stations, and (iv) a plurality of base stations coupled to the networking device.

19. A method comprising:
  in a networking device coupled between one or more signaling sources and a group of one or more destinations in a cellular wireless network, determining that a rate of signaling traffic intended for the group of one or more destinations is greater than a threshold rate, wherein the threshold rate comprises a maximum rate of signaling traffic that the one or more destinations is capable of processing;
  responsive to determining that the rate of signaling traffic intended for the group of one or more destinations is greater than the threshold rate, the networking device lowering a priority assigned to signaling traffic intended for the group of one or more destinations; and
  the networking device outputting signaling traffic intended for the group of one or more destinations with the lowered priority.

\* \* \* \* \*